(12) United States Patent
Long et al.

(10) Patent No.: US 7,720,633 B2
(45) Date of Patent: May 18, 2010

(54) BIVARIATE HISTOGRAM FOR IMPULSE NOISE MONITOR

(75) Inventors: Guozhu Long, Fremont, CA (US); Dong Wei, Austin, TX (US); Jun Zhou, Shenzhen (CN); Jianhua Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 184 days.

(21) Appl. No.: 11/968,322

(22) Filed: Jan. 2, 2008

(65) Prior Publication Data

US 2008/0167838 A1     Jul. 10, 2008

Related U.S. Application Data

(60) Provisional application No. 60/884,336, filed on Jan. 10, 2007.

(51) Int. Cl.
    G06F 17/18     (2006.01)
    H04B 15/00    (2006.01)
    H04B 1/38     (2006.01)

(52) U.S. Cl. .................. 702/180; 375/219; 714/701

(58) Field of Classification Search ............... 702/180, 702/181; 73/645, 646; 370/231, 458, 252; 375/219, 224, 346; 714/701, 776
    See application file for complete search history.

(56) References Cited

U.S. PATENT DOCUMENTS 7,529,984 B2 *  5/2009  Heise ................... 714/701

2008/0232444 A1 *  9/2008  Tzannes ................ 375/219

FOREIGN PATENT DOCUMENTS

| EP | 1126729 A1 | 8/2001 |
| EP | 1672827 A1 | 6/2006 |
| WO | 2005086405 A2 | 9/2005 |

OTHER PUBLICATIONS

ITU-Telecommunication Standarization Sector; TD 158R1 G.997.1 Editor; "G.ploam: G.vdsl: Report of ad-hoc session on Impulse Noise Monitoring", Study Group 15, Geneva, Oct. 30 to Nov. 10, 2006.*

(Continued)

*Primary Examiner*—John H Le
(74) *Attorney, Agent, or Firm*—Conley Rose, P.C.; Grant Rodolph

(57) ABSTRACT

A method and apparatus for creating a bivariate histogram with a plurality of variables using impulse noise data is disclosed. The bivariate histogram describes the joint statistics between at least two of the variables. Also disclosed is an impulse noise monitor (INM) in communication with an impulse noise sensor (INS). The INM receives error data from the INS and creates a bivariate histogram with a plurality of variables using the error data. Included is a method for providing a bivariate histogram with an impulse noise length (IL) and an impulse noise inter-arrival time (IAT) for a plurality of impulse noise events. The IL and the IAT are each measured in integer multiples of discrete multi-tone symbols, and the bivariate histogram is used to determine a minimum impulse noise protection.

20 Claims, 2 Drawing Sheets

OTHER PUBLICATIONS

Editor for G.VDSL, "G.vdsl: Updated Issues List", Study Group 15, TD 176 (WP1/15), International Telecommunication Union, Telecommunication Standardization Sector, Study Period 2005-2008, Geneva, Oct. 30-Nov. 10, 2006, 22 pages.

Alcatel, "G.VDSL: High Level Description of proposed VDSL2 Impulse Noise Monitor", ITU-Telecommunication Standardization Sector, Study Group 15, Temporary Document CD-043, Denver, Colorado, Sep. 25-29, 2006, 7 pages.

Infineon Technologies, "G.vdsl2, G.ploam: Proposal for a Primitives and Parameters to Support INM", ITU-Telecommunication Standardization Sector, Study Group 15, Temporary Document GB-077, Gent, Belgium, Jun. 12-16, 2006, 8 pages.

Alcatel, "G.VDSL: High Level Requirements for the VDSL2 Impulse Noise Monitor", ITU-Telecommunication Standardization Sector, Study Group 15, Temporary Document ZC-047, Shenzhen, China, Apr. 24-28, 2006, 6 pages.

ITU-T, "Series G: Transmission Systems and Media, Digital Systems and Networks, Digital Sections and Digital Line System—Access Networks, Asymmetric Digital Subscriber Line Transceivers 2 (ADSL2)", Telecommunication Standardization Sector of ITU, G.992.3, Jan. 2005, 436 pages.

ITU-T, "Series G: Transmission Systems and Media, Digital Systems and Networks, Digital Sections and Digital Line System—Access Networks, Asymmetric Digital Subscriber Line Transceivers 2 (ADSL2), Amendment 1", Telecommunication Standardization Sector of ITU, G.992.3, Sep. 2005, 32 pages.

ITU-T, "Series G: Transmission Systems and Media, Digital Systems and Networks, Digital Sections and Digital Line System—Access Networks, Asymmetric Digital Subscriber Line Transceivers 2 (ADSL2), Amendment 2", Telecommunication Standardization Sector of ITU, G.992.3, Mar. 2006, 12 pages.

ITU-T, "Series G: Transmission Systems and Media, Digital Systems and Networks, Digital Sections and Digital Line System—Access Networks, Asymmetric Digital Subscriber Line Transceivers 2 (ADSL2), Amendment 3", Telecommunication Standardization Sector of ITU, G.992.3, Dec. 2006, 20 pages.

ITU-T, "Series G: Transmission Systems and Media, Digital Systems and Networks, Digital Sections and Digital Line System—Access Networks, Very High Speed Digital Subscriber Line Transceivers 2 (VDSL2)", Telecommunication Standardization Sector of ITU, G.993.2, Feb. 2006, 252 pages.

ITU-T, "Series G: Transmission Systems and Media, Digital Systems and Networks, Digital Sections and Digital Line System—Access Networks, Very High Speed Digital Subscriber Line Transceivers 2 (VDSL2), Corrigendum 1", Telecommunication Standardization Sector of ITU, G.993.2, Dec. 2006, 25 pages.

Foreign Communication From a Related Counterpart Application—International Search Report and Written Opinion, PCT/CN2008/070051, Apr. 24, 2008, 12 pages.

* cited by examiner ered by impulse noise interferences generated by external sources. For example, refrigerators, hairdryers, dimmers, and other electrical equipment at the customer premises generate impulse noises when they are turned on or draw additional power. The electrical interference generated by these impulse noise events may cause burst errors in the DSL data transmissions. To ensure reliable data transmission, the various DSL specifications define certain levels of impulse noise protection (INP). Higher INP levels provide lower error rates, but at the cost of reduced transmission rates.

BIVARIATE HISTOGRAM FOR IMPULSE NOISE MONITOR

CROSS-REFERENCE TO RELATED APPLICATIONS

This application claims priority to U.S. Provisional Patent Application Ser. No. 60/884,336 filed Jan. 10, 2007 by Long, et al. and entitled, "Bivariate Histogram for Impulse Noise Monitor," which is incorporated by reference herein as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital Subscriber Line (DSL) technologies, such as Asymmetric DSL (ADSL) and Very High Speed DSL (VDSL), provide a large amount of communication bandwidth using existing twisted-pair telephone subscriber lines. When transmitting data over the subscriber lines, DSL technologies typically use a Discrete Multi-Tone (DMT) line code that assigns a number of bits to each tone or sub-carrier. The DMT may be adjusted to various channel conditions that may occur during training and initialization of the modems at each end of a subscriber line.

Data signals transmitted over subscriber lines may be significantly degraded by impulse noise interferences generated by external sources. For example, refrigerators, hairdryers, dimmers, and other electrical equipment at the customer premises generate impulse noises when they are turned on or draw additional power. The electrical interference generated by these impulse noise events may cause burst errors in the DSL data transmissions. To ensure reliable data transmission, the various DSL specifications define certain levels of impulse noise protection (INP). Higher INP levels provide lower error rates, but at the cost of reduced transmission rates.

SUMMARY

In one aspect, the disclosure includes a network component comprising at least one processor configured to implement a method comprising creating a bivariate histogram using impulse noise data comprising a plurality of variables, wherein the bivariate histogram describes the joint statistics between at least two of the variables.

In another aspect, the disclosure includes an apparatus comprising an impulse noise monitor (INM) in communication with an impulse noise sensor (INS), wherein the INM is configured to receive impulse noise information from the INS and create a bivariate histogram comprising a plurality of variables using the impulse noise information.

In yet another embodiment, the disclosure includes a method comprising providing a bivariate histogram comprising an impulse noise length (IL) and an impulse noise inter-arrival time (IAT) for a plurality of impulse noise events, wherein the IL and the IAT are each measured in integer multiples of DMT symbols, and wherein the bivariate histogram is used to determine a minimum INP.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems, methods, or both may be implemented using any number of techniques, whether currently known or in existence. The disclosure should in no way be limited to the illustrative implementations, drawings, and techniques illustrated below, including the examples of designs and implementations illustrated and described herein, but may be modified within the scope of the appended claims along with their full scope of equivalents.

Disclosed herein is an apparatus and process for determining INP settings using a bivariate histogram. For each downstream DMT symbol sent from an XDSL transceiver unit at the central office (XTU-C) to an XDSL transceiver unit at a remote site (XTU-R), the INS at the XTU-R detects whether the DMT symbol is corrupted by the impulse noise. The INM takes impulse noise information from the INS and compiles the impulse noise information into a two-dimensional bivariate histogram where the two variables are IL and IAT. The IL may be defined as the time from beginning to end of an impulse noise event, measured in an integral number of DMT symbols. The IAT may be defined as the time between the start of two consecutive impulse noise events, measured in an integral number of DMT symbols. The bivariate histogram data may then be further analyzed to derive other impulse noise parameters that are sent to a central office (CO). Alternatively, the bivariate histogram may be sent to XTU-C directly. Upon receiving data from XTU-R, the XTU-C or a network management system (NMS) further analyzes the data and determines the proper INP settings. Such process may be repeated periodically to provide up-to-date impulse noise information. If the INP settings are inappropriate, the INP settings can be adjusted. The process described herein can also be implemented in reverse to determine the NP settings for upstream data. However, for upstream, the INS, INM and INP decision are all located in XTU-C, thus there is no need to send impulse noise information across the subscriber loop.

Figure 1:
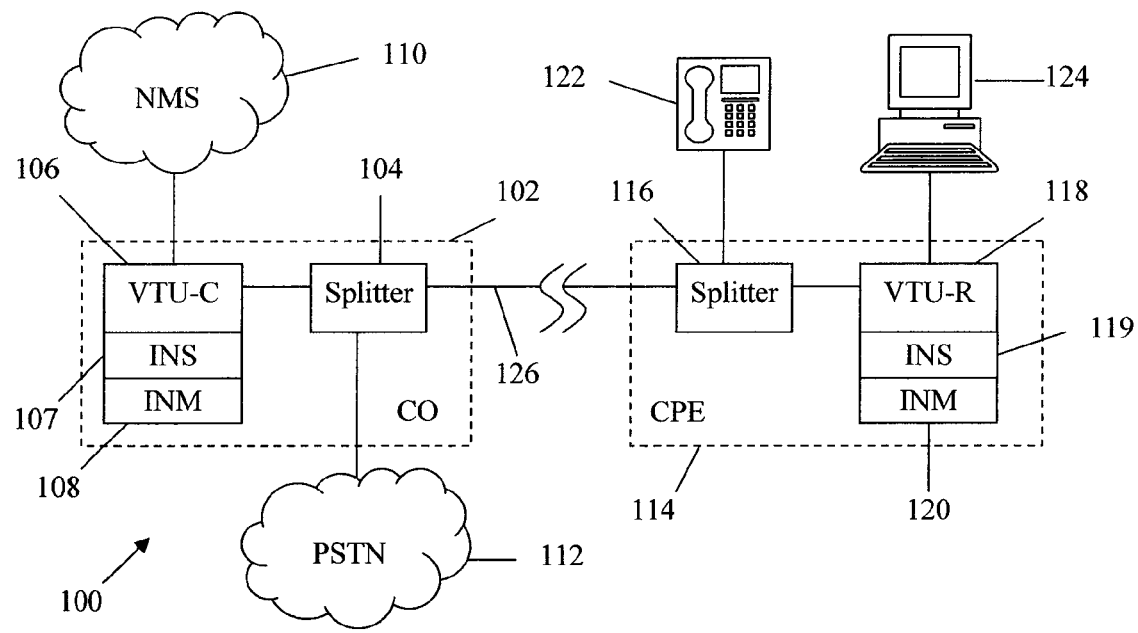
FIG. 1 is a schematic diagram of one embodiment of a DSL system.

FIG. 1 illustrates one embodiment of a DSL system 100. The system 100 may be a VDSL2 system as defined in ITU-T standard G.993.2 (incorporated by reference herein), an ADSL2 system as defined in ITU-T standard G.992.3 (incorporated by reference herein), or any other access system known to persons of ordinary skill in the art. Moreover, persons of ordinary skill in the art will appreciate that FIG. 1 is merely representative of numerous different DSL system implementations, and may be modified to include splitters, filters, management entities, and various other hardware, software, and functionality known to persons of ordinary skill in the art.

The left side of FIG. 1 represents one embodiment of the CO 102. The CO 102 may comprise a splitter 104 coupled to a subscriber loop 126 and a public switched telephone network (PSTN) 112, and a XTU-C 106 coupled to the splitter 104 and a NMS 110. The subscriber loop 126 may be a telecommunication path between the CO 102 and one customer premises equipment (CPE) 114, and may comprise one or more twisted pairs of copper cable. The splitter 104 may be a 2:1 coupler that transmits data signals received from the subscriber loop 126 to the PSTN 112 and the XTU-C 106, and transmits data signals received from the PSTN 112 and the XTU-C 106 to the subscriber loop 126. The splitter 104 may optionally comprise one or more filters to help direct data signals to/from the PSTN 112 and the XTU-C 106. The PSTN 112 may be a network that generates, processes, and receives voice or other voice-band signals. The XTU-C 106, which may be referred to as an VTU-C in VDSL2 networks, or ATU-C in ADSL networks or a modem in any network, may be a combination transmitter/receiver (transceiver) that transmits signals to and receives signals from the splitter 104. The XTU-C 106 may process the received signals or may simply pass the received signals to the NMS 110. The XTU-C 106 may also comprise a forward error correction (FEC) codeword generator that generates FEC data and an interleaver that interleaves the transmitted data across a plurality of DMT symbols. The NMS 110 may be a network management infrastructure that processes data exchanged with the XTU-C 106, and is typically coupled to one or more broadband networks, such as the Internet.

The XTU-C 106 may set the INP level, which is the protection capability of the transmitted data against impulse noise events. Examples of the parameter settings associated with INP include the frame size and redundancy of FEC, such as the Reed-Solomon (RS) codewords, the depth of the data interleaver, and combinations thereof. Those settings are typically limited by one or more constraints. For example, the INP setting is limited by the minimum required INP (INP_min), which is defined as the lowest level of INP that can be set while maintaining a desired impulse noise protection. On the other hand, interleaver setting is limited by the maximum interleaver delay (Delay_max), which is defined as the highest level of interleaver delay that the operators define to satisfy the delay requirement of the applications provided. The interleaver depth is sometimes limited by the device memory size. There may be other constraints as well.

The CO 102 may further comprise the INS 107 and INM 108, which may be coupled to or part of the XTU-C 106. As described below, the INS 107 detects which upstream DMT symbols are corrupted by the impulse noise, and the INM 108 may receive upstream impulse noise information from the INS 107 and compile the impulse noise information to obtain the impulse noise statistics. The impulse noise statistics may be in the format of the bivariate histogram, but other formats may be used as well. The impulse noise statistics may be used by the XTU-C 106 or the NMS 110 to determine the upstream INP settings. The INM 108 may update the bivariate histogram as the new impulse noise information is received from the INS 107, as directed by an operator (for example, update once upon receiving instruction from NMS 110, or periodically with the period set by the NMS 110). The XTU-C 106 or the NMS 110 may dynamically optimize the INP settings or INP limits such that a specified level of impulse noise protection is maintained while maintaining a required data transmission rate.

The right side of FIG. 1 represents one embodiment of the CPE 114. The CPE 114 may comprise a splitter 116 coupled to the subscriber loop 126 and a telephone 122, and a XTU-R 118 coupled to the splitter 116 and a computer 124. The splitter 116 may be a 2:1 coupler that transmits data signals received from the subscriber loop 126 to the telephone 122 and the XTU-R 118, and transmits data signals received from the telephone 122 and the XTU-R 118 to the subscriber loop 126. The splitter 116 may optionally comprise one or more filters to help direct data signals to and from the telephone 122 and the XTU-R 118. The telephone 122 may be hardware, software, or both that generates, processes, and receives voice or other voice-band signals. The XTU-R 118, which may be referred to as an VTU-R in VDSL2 networks, or ATU-R in ADSL networks or a modem in any network, may be a transceiver that transmits signals to and receives signals from the splitter 116. The XTU-R 118 may process the received signals to obtain the transmitted data from the CO 102, and pass the received data to the devices such as a computer 124, which may access Internet through the XDSL connection.

The CPE 114 may further comprise the INS 119 and INM 120, which may be coupled to or part of the XTU-R 118. As described below, the INS 119 detects which downstream DMT symbols are corrupted by the impulse noise, and the INM 120 may receive downstream impulse noise information from the INS 119 and compile the impulse noise information to obtain the downstream impulse noise statistics. The information may include, for example, the IL and the IAT. The impulse noise statistics may be in the format of the bivariate histogram, but other formats may be used as well. The impulse noise statistics may be sent to the XTU-C 106 or the NMS 110 to determine the downstream INP settings. The INM 120 may update the bivariate histogram as the new impulse noise information is received from the INS 119, and the updated impulse noise parameters may be sent to the XTU-C 106 or the NMS 110, which may dynamically optimize the INP settings or INP limits such that a specified level of impulse noise protection is maintained while maintaining a required data transmission rate. In an embodiment, the impulse noise information, particularly the IL and IAT, is raw data in that it is accurate to within about one DMT symbol and has not been approximated, merged, bridged, or otherwise modified. Once the impulse noise information is generated, it may be sent to the XTU-C 106 or the NMS 110 by the XTU-R 118. Specifically, the impulse noise information may be sent to the XTU-C 106 or the NMS 110 on a periodic basis as the impulse noise statistics are compiled, or the impulse noise information may be generated and sent to the XTU-C 106 or the NMS 110 as instructed by the XTU-C 106 or the NMS 110.

Figure 2:
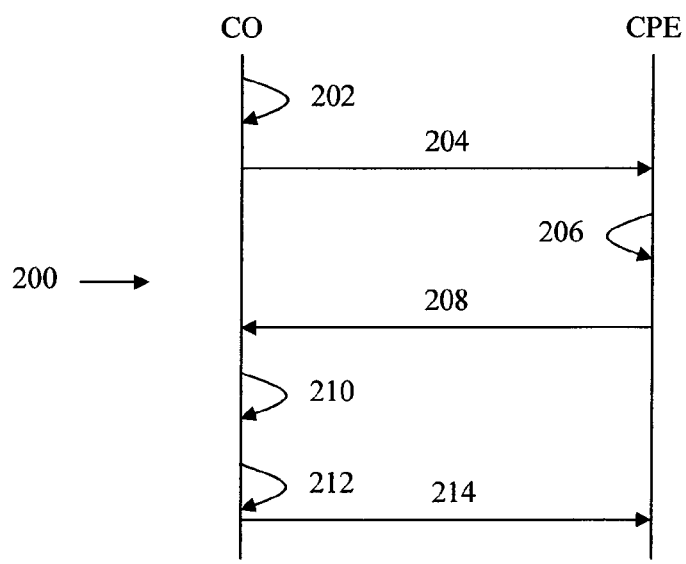
FIG. 2 is a protocol diagram of one embodiment of a process for determining INP settings.

FIG. 2 illustrates an embodiment of a process 200 for determining the INP settings. Although the process 200 is described as implemented by the CPE and CO for downstream data, a similar process may be implemented by the CO for upstream data. The process 200 begins when the original (default) INP settings are applied at 202. As described above, INP is mainly related to the FEC settings and the interleaver settings. Higher INP requires typically more redundancy in FEC and/or deeper interleaver depth, which are used improve the ability of the CPE to correct burst errors in the data stream caused by impulse noises. The process 200 continues when the data is transmitted at 204. The data may be any type of data that is destined for the customer, and is transmitted in DMT symbols. When the data is received by the CPE, the CPE may analyze the integrity of each DMT symbol to determine which symbols are corrupted by impulse noises. This information may be compiled into the impulse noise statistics in the form of the bivariate histogram of IL and IAT or some other format at 206. Specifically, the impulse noise information determined by the INS at the CPE may be compiled into the bivariate histogram so that a complete statistical representation of the impulse noises may be generated. As used herein, the term bivariate histogram refers to a mathematical, statistical, or graphical representation of a data set comprising at least two variables. For example, if the impulse noise information includes the IL and IAT, then the IL and IAT of each impulse noise event may be plotted on the bivariate histogram using the X and Y axes of a Cartesian coordinate plane as IL and IAT, respectively. In such a bivariate histogram, the intersection of each pair of variables represents a bin that may receive no, one, or a plurality of impulse noise event data points. As such, each bin may be represented as a third dimension by a counter. The bivariate histogram or the impulse noise parameters derived from such a histogram may then be transmitted back to the CO at 208.

The process 200 continues with the determination of INP based on the bivariate histogram or other impulse noise parameters derived from the histogram at 210. For example, in the case of the IL-IAT bivariate histogram described above, a statistical analysis can be conducted on the bivariate histogram to determine the probability of the uncorrectable impulse noises for a certain INP level. The bivariate histogram also provides information about how far apart the impulses are separated. For impulses with very small gaps, it may be helpful to bridge them into longer impulses. Specifically, the statistical evaluation of the impulse noise statistics may reveal a mean, a median, a standard deviation, a variance, other statistical information, or combinations thereof regarding the impulse noises, based on which the appropriate INP level is determined. If the currently used INP level is insufficient or excessive, then the NP can be adjusted, and the process 200 repeated with the new INP settings. The process 200 continues at 212 with the calculation of FEC parameters and interleaver depth based on the INP just determined. These parameters are then sent to CPE at 214 so that the CO transmitter and the CPE receiver can apply these new parameters simultaneously.

Figure 3:
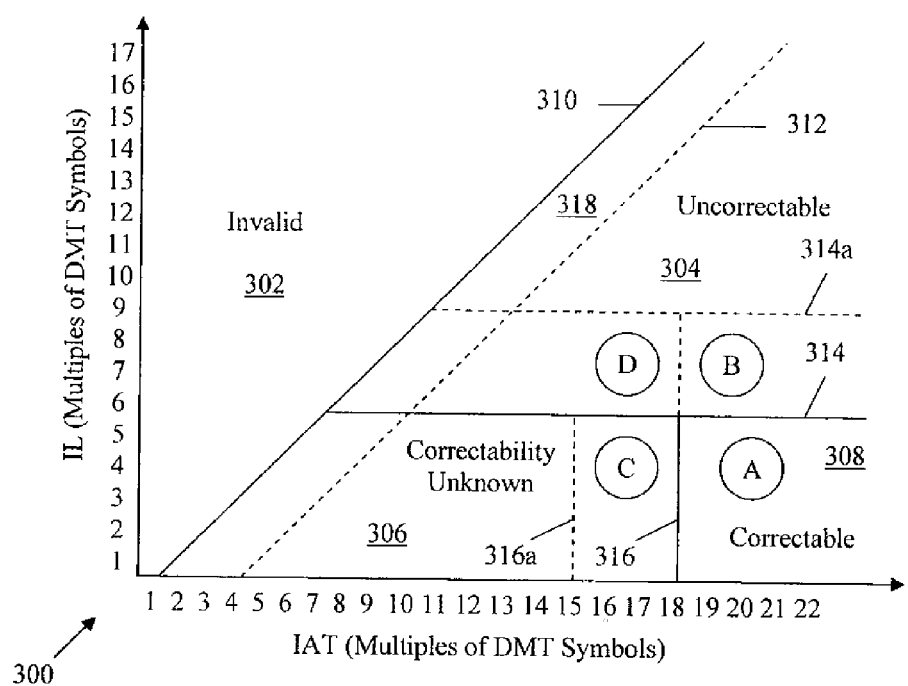
FIG. 3 is an illustration of one embodiment of a bivariate histogram of the impulse noise data.

FIG. 3 illustrates an embodiment of the bivariate histogram 300. Specifically, the bivariate histogram 300 illustrates the IL and IAT of each occurrence of an impulse noise event, measured as integer multiples of DMT symbols. The impulse noise statistics may be shown as counters on the bivariate histogram 300, and may occur in clusters, such as those in areas A, B, C, and D.

There are several lines of interest in bivariate histogram 300. Line 310 represents the set of points where IAT=IL+1. The area above line 310 is invalid because, by definition, there should be at least one DMT symbol between consecutive impulse noise events. Line 312 represents the set of points where IAT=IL+n, where n is equal to the inter-impulse noise event gap, e.g., the IAT minus the IL. Line 314 represents the INP setting determined by the CO. If the CO has the INP setting set at the minimum value, then line 314 represents INP_min. Line 316 represents the interleaver setting implemented by the CO. If the CO has the interleaver setting set at the maximum value, then line 314 corresponds to Delay_max.

There are also several regions of interest in the bivariate histogram 300. Region 302, which is bounded by the IL axis and line 310, represents an invalid region where no data points should occur. Specifically, the IL of an impulse noise event should not be greater than the IAT between the impulse noise event and the subsequent impulse noise event. Region 304, which is bounded by line 314 and line 310, represents a region in which the error due to the occurrence of the impulse noise event was uncorrectable. Specifically, region 304 may represent situations where the impulse noise event was sufficiently long to exceed the ability of the FEC algorithm to correct the degraded symbols. Region 306, which is bounded by line 310, line 314, and line 316, represents a region in which the error due to the occurrence of the impulse noise event may or may not be correctable. Specifically, region 304 may represent situations where the impulse noise event was sufficiently short to allow the FEC algorithm to correct the degraded data, but the occurrence of a subsequent impulse noise event may have degraded the data beyond the ability of the FEC to correct the data. Thus, region 306 may represent a mixture of situations where the data was correctable and situations where the data was uncorrectable. Region 308, which is bounded by line 314 and line 316, represents a region in which the error due to the occurrence of the impulse noise event was correctable. Specifically, region 306 may represent situations where the impulse noise event was sufficiently short to allow the FEC algorithm to correct the degraded symbols, and the arrival of the subsequent impulse noise event was sufficiently separated from the original impulse noise event to allow the FEC to correct the data. Finally, region 318, which is bounded by line 310 and line 312, represents the situations where the inter-impulse noise event gap is no larger than n DMT symbols.

In one example, assume that the error data clusters within area A. Because area A is within region 308, the errors that occur within area A are correctable. However, the error data may change over time such that it clusters within area B instead of area A. Because area B is within region 304, the errors that occur within area B are not correctable. Thus, the CO may increase INP by changing the FEC setting such that line 314 becomes line 314a, which will also extend line 316 up to line 314a. Such a change in the FEC setting will place areas A and B within region 308, and thus make the errors correctable. Increasing INP through changing FEC settings enhances the ability to correct errors caused by impulse noises, but requires more redundancy and/or longer delay, which are not desirable in terms data rate and/or transmission delay. If the error data subsequently changes over time such that it returns to area A, then the CO can reduce INP by changing the FEC setting such that line 314a becomes line 314. By monitoring the error data using the bivariate histogram 300 and adjusting the FEC setting as described, the CO can achieve a suitable level of INP without overly reducing the bandwidth of the transmitted data.

In another example, assume again that the error data clusters within area A. In this example, the error data changes over time such that it clusters within area C instead of area A. Because area C is within region 306, the errors that occur within area C may or may not be correctable. As this is an undesirable area due to the uncertainty related to error correction, the CO may change the interleaver setting such that line 316 becomes line 316a. Such a change in the interleaver setting will place areas A and C within region 308, and thus make the errors correctable. If the error data subsequently changes over time such that it goes to area D, then the CO can change the FEC setting such that line 314 become line 314a. If the error data subsequently changes over time such that it returns to area A, then the CO can change the interleaver and FEC settings such that line 316a becomes line 316 and line 314a becomes line 314. By monitoring the error data using the bivariate histogram 300 and adjusting the INP settings as described, the CO can achieve a suitable level of INP without overly delaying the data transmission and/or reducing the bandwidth of the transmitted data.

In yet another example, the bivariate histogram may be used to analyze the error data with a specific inter-impulse noise event gaps. Specifically, the variable n can be adjusted to a desired inter-impulse noise event gap, which will reposition line 312 accordingly. Subsequent analysis of region 318 will then yield the joint statistics of the error data with impulse noise event gaps no larger than n DMT symbols, as well as their associated impulse lengths. This analysis is valid for any n greater than one.

The bivariate histogram may be preferred because it is a more statistically complete representation of the error data than univariate histograms. In an embodiment, the CO may provide a univariate histogram for the IL and another univariate histogram for the IAT, both counted in integer multiples of DMT symbols. However, the univariate IL and IAT histograms are not able to illustrate the correlation between IL and IAT. Specifically, two univariate histograms with multimodal distribution cannot reliably illustrate whether the various peaks in the univariate histograms intersect each other. For example, consider three data clusters at points (A, C), (A, D), and (B, C). The univariate IL histogram will indicate peaks at A and B, and the univariate IAT histogram will indicate peaks at C and D. The bivariate histogram will clearly indicate the absence of a data cluster at (B, D), but the two univariate histograms may be indeterminate, or worse, may falsely indicate a data cluster at (B, D). A similar situation exists when the intersecting data sets are only (B, C) and (A, D). Specifically, the bivariate histogram will clearly indicate the absence of a data cluster at (B, D) and (A, C), but the two univariate histograms may be indeterminate, or worse, may falsely indicate a data cluster at (B, D) and (A, C). Thus, the bivariate histogram may provide more complete statistical information than a plurality of univariate histograms of the error data. As shown by the examples described herein, a complete and accurate statistical correlation of the error data is an important consideration when determining the INP settings.

Furthermore, the univariate histogram information may be derived from the bivariate histogram, while the converse is not necessarily true. For example, we can denote hist(IL) and hist(IAT) as the univariate histograms of IL and IAT counted in integer multiples of DMT symbols, respectively. Further, we can denote hist2(IL, IAT) as the bivariate histogram of IL and IAT, counted in integer multiples of DMT symbols. With appropriate normalization, hist(IL) and hist(IAT) can be viewed as the estimated probability density functions (PDFs) of IL and IAT. Similarly, with appropriate normalization hist2 (IL, IAT) can be viewed as the estimated joint PDF of IL and IAT. The Joint PDF of IL and IAT may illustrate the correlation between IL and IAT. The PDF of IL can be expressed as the marginal density of IL from the joint PDF of IL and IAT, which yields:

$$hist(IL) = \sum_{IAT} hist2(IL, IAT).$$

Similarly, the PDF of IAT can be expressed as the marginal density of IAT from the joint PDF of IL and IAT, which yields:

$$hist(IAT) = \sum_{IL} hist2(IL, IAT).$$

Thus, the statistical information contained in the univariate histograms hist(IL) and hist(IAT) can be derived from the bivariate histogram hist2(IL, IAT). As illustrated by the examples described herein, the converse is not necessarily true.

The bivariate histogram may also be preferred over a pulse gap bridging (PGB) mechanism. The PGB mechanism is described by Van Bruyssel in "G.VDSL: High Level Description of Proposed VDSL2 Impulse Noise Monitor," ITU-T SG15/Q4 Contribution ZC-047 (2006) and "G.VDSL: High Level Description of Proposed VDSL2 Impulse Noise Monitor," ITU-T SG15/Q4 Contribution CD-043 (2006), both of which are incorporated herein by reference. The PGB mechanism observes that impulse noise events sometimes occur as a series of separate smaller impulses. The PGB mechanism treats these smaller impulses as a single impulse by merging the series of smaller impulses into a single impulse noise event prior to constructing univariate histograms for IL and IAT. Specifically, the PGB mechanism includes a PGB value, which may have an integer value from zero to seven DMT symbols. Consecutive impulse noise events are merged into a single impulse even when two consecutive impulse noise events are separated by a value less than or equal to the PGB value.

There are several shortcomings of the PGB mechanism. First, the PGB mechanism prevents the NM from getting the true statistics of IL and IAT. Specifically, because there is no correlation between the IL and IAT, a complete statistical representation of the error data cannot be obtained from the PGB mechanism. Second, only one PGB value can be used for bridging gaps at any given period. Thus, it is difficult or impossible to determine the appropriate PGB value for a particular deployment scenario. Third, the PGB mechanism tends to lead to excessively conservative INP settings. Thus, the PGB mechanism causes an unnecessary reduction in the data transmission rate.

The shortcomings of the PGB mechanism are evident from a statistical standpoint. When the PGB mechanism bridges two events on the IL-IAT plane, $(IL_1, IAT_1)$ and $(IL_2, IAT_2)$, it yields a single event that is a combination of the two: $(IL_2+IAT_1, IAT_2)$. The merging of multiple impulse noise events moves the resulting impulse noise event towards the uncorrectable region, e.g., region 304 in FIG. 3. The migration of the impulse noise event to the uncorrectable region causes the INP settings, e.g., the INP_min, to be increased to compensate for the relocation of the impulse noise event data. This is similar to the above example where the error data migrating from area A to area B in FIG. 3.

The shortcomings with the PGB mechanism can also be illustrated in the following example. Assume a PGB value of two DMT symbols, the length of each of a series of impulse noise events is one DMT symbol, and the smallest gap between impulse noise events is two DMT symbols. In such a case, the PGB mechanism creates an IL of four DMT symbols when analyzing the following symbol sequence: D N N D N N N N D, where "N" and "D" stand for non-degraded and degraded symbols, respectively. With an estimated IL of four DMT symbols, the PGB indicates that an INP_min value of five DMT symbols is needed. In contrast, the actual IL is one DMT symbol and thus an INP_min value of two DMT symbols is sufficient INP.

Compared with the PGB mechanism, the bivariate histogram allows the INM to obtain a more complete statistical representation of the IL, the IAT and the correlation between the IL and IAT. Assume a bivariate histogram hist2(IL, IAT) and a PGB value of n DMT symbols. Any impulse with $(IL_1, IAT_1)$, that is followed another impulse $(IL_2, IAT_2)$ by a gap no larger than n DMT symbols contributes to a new point in hist2(IL, IAT) with IL=$IL_2$+$IAT_1$ and IAT=$IAT_2$. In FIG. 3, the region bounded inclusively by the two lines IAT=IL+1 (line 310) and IAT=IL+n (line 312) yields the joint statistics of the gaps no larger than n DMT symbols and their associated impulse lengths for any n. These statistics for the small inter-impulse gaps may be important because they may require the CO to determine whether to increase INP_min setting to account for those small pulse gaps, as well as the magnitude of the increase. There is no need to predetermine a PGB value before collecting the error data for the IL and the IAT. In fact, the statistics for a plurality of small inter-impulse noise event gaps of different lengths can be gathered simultaneously, and an appropriate PGB value may be selected after the histogram is generated. Thus, there is a lower risk of producing an excessively conservative INP setting.

The bivariate histogram may also be preferred over the severely degraded symbols during the interleaving period (SDSIP) mechanism. The SDSIP mechanism is described by Oksman in "G.VDSL2, G.PLOAM: Proposal for a primitives and parameters to support INM" ITU-T SG15/Q4 Contribution GB-077 (2006), which is incorporated by reference as if reproduced in its entirety. The SDSIP mechanism counts severely degraded symbols in a certain time period as the indicator of the impulse noise conditions. Specifically, the SDSIP mechanism uses a sliding window to detect the severely degraded symbols during the FEC codeword span. When using the SDSIP mechanism, the correlation of IL and IAT is not well preserved, which may lead to excessively conservative INP settings. In contrast, the bivariate histogram preserves the original statistics of impulse noise events and produces more accurate INP settings.

The impulse noise monitoring described above may be incorporated into XDSL transceivers, or implemented by a separate processor coupled to the XDSL transceivers. The processor may be implemented as one or more CPU chips, or may be part of one or more application specific integrated circuits (ASICs), with sufficient memory.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
   at least one processor configured to implement a method comprising:
   creating a bivariate histogram using impulse noise data comprising a plurality of variables,
   wherein the variables comprise an impulse length (IL) and an inter-arrival time (IAT), and
   wherein the bivariate histogram describes the joint statistics between the IL and the IAT.

2. The network component of claim 1, wherein the method further comprises analyzing the bivariate histogram to determine a proper impulse noise protection (INP) setting.

3. The network component of claim 2, wherein the INP settings are associated with forward error correction (FEC) settings and interleaver settings.

4. The network component of claim 3, wherein the bivariate histogram comprises a correctable region separated from an uncorrectable region by the FEC setting, and wherein the method further comprises changing the FEC setting such that the impulse noise data moves from the uncorrectable region to the correctable region.

5. The network component of claim 2, wherein analyzing the bivariate histogram comprises performing a statistical analysis of the impulse noise data in the bivariate histogram.

6. The network component of claim 2, wherein the method further comprises selecting the INP setting.

7. The network component of claim 6, wherein the method further comprises transmitting data using the INP setting.

8. The network component of claim 7, wherein the method further comprises receiving the impulse noise data from a remote impulse noise sensor.

9. The network component of claim 8, wherein the method further comprises modifying the INP setting in response to the analysis.

10. A network component comprising:
    at least one processor configured to implement a method comprising:
    creating a bivariate histogram using impulse noise data comprising a plurality of variables,
    wherein the bivariate histogram describes the joint statistics between at least two of the variables,
    wherein the method further comprises analyzing the bivariate histogram to determine a proper impulse noise protection (INP) setting,
    wherein the INP settings are associated with forward error correction (FEC) settings and interleaver settings,
    wherein the bivariate histogram comprises a correctable region separated from a correctability unknown region by the interleaver setting, and
    wherein the method further comprises changing the interleaver setting such that the impulse noise data moves from the correctability unknown region to the correctable region.

11. A network component comprising:
    at least one processor configured to implement a method comprising:
    creating a bivariate histogram using impulse noise data comprising a plurality of variables,
    wherein the bivariate histogram describes the joint statistics between at least two of the variables,
    wherein the method further comprises analyzing the bivariate histogram to determine a proper impulse noise protection (INP) setting,
    wherein analyzing the bivariate histogram comprises performing a statistical analysis of the impulse noise data in the bivariate histogram,
    wherein statistical analysis produces impulse noise statistics comprising a mean, a median, a standard deviation, a variance, or combinations thereof, and wherein analyzing the bivariate histogram further comprises comparing the INP setting to the impulse noise statistics.

12. An apparatus comprising:
an impulse noise monitor (INM) in communication with an impulse noise sensor (INS),
wherein the INM is configured to receive impulse noise information from the INS and create a bivariate histogram comprising an impulse length and an inter-arrival time based on the impulse noise information.

13. The apparatus of claim 12, wherein the impulse length is accurate to within about one discrete multi-tone (DMT) symbol of the actual length of an impulse noise event.

14. The apparatus of claim 12, wherein the inter-arrival time is accurate to within about one discrete multi-tone (DMT) symbol of the actual time between the start of two consecutive impulse noise events.

15. The apparatus of claim 12, wherein the INM receives a substantially continuous stream of the error data from the INS.

16. The apparatus of claim 12, wherein the INM receives impulse noise information from the INS at periodic intervals.

17. The apparatus of claim 12, wherein the INM is part of a digital subscriber line transceiver unit.

18. A method implemented on at least one processor, comprising:
providing a bivariate histogram comprising an impulse noise length (IL) and an impulse noise inter-arrival time (IAT) for a plurality of impulse noise events,
wherein the IL and the IAT are each measured in integer multiples of discrete multi-tone symbols, and
wherein the bivariate histogram is used to determine a minimum impulse noise protection.

19. The method of claim 18, wherein the bivariate histogram is further used to determine a maximum interleaver delay.

20. The method of claim 18 further comprising:
deriving from the bivariate histogram a first univariate histogram comprising only the IL; and
deriving from the bivariate histogram a second univariate histogram comprising only the IAT.

* * * * *